UNITED STATES PATENT OFFICE.

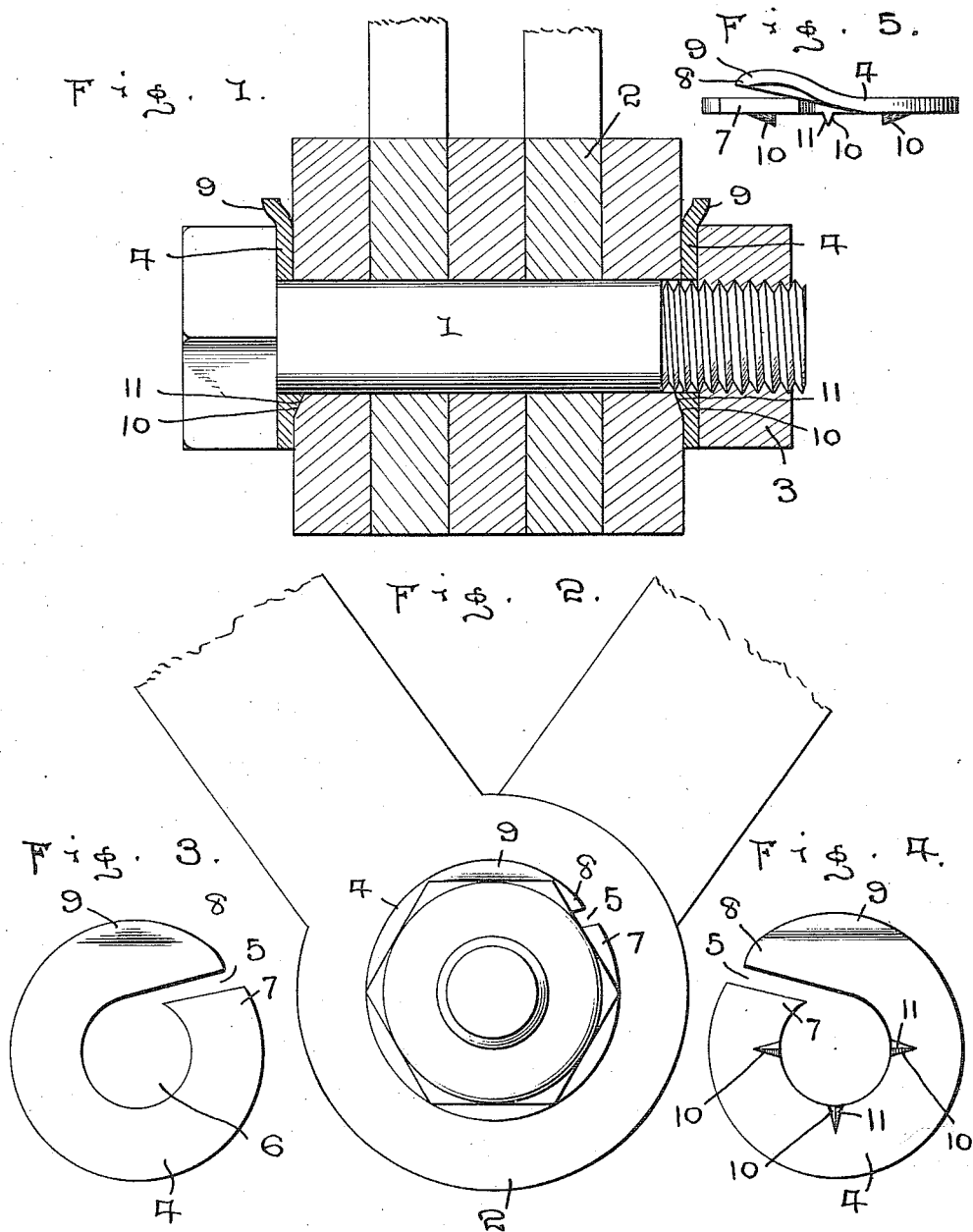

OLOF A. NORLUND, OF WILLIAMSPORT, PENNSYLVANIA.

NUT-LOCK.

979,545.

Specification of Letters Patent. Patented Dec. 27, 1910.

Application filed March 16, 1910. Serial No. 549,620.

*To all whom it may concern:*

Be it known that I, OLOF A. NORLUND, a citizen of the United States, residing at Williamsport, in the county of Lycoming and State of Pennsylvania, have invented certain new and useful Improvements in Nut-Locks; and I do hereby declare the following to be a full, clear, and exact description of the invention, such as will enable others skilled in the art to which is appertains to make and use the same.

My invention relates to new and useful improvements in nut locks and more particularly to that class wherein a split washer is used for holding the nut in its locked position and my object is to provide a washer having a slit therein extending tangentially to the axis of the washer.

A further object is to provide one of the ends of the slit portion with a curved projection which will engage the nut and hold the same against casual rotation, and, A further object is to provide teeth upon one face of the washer and so construct the same that they will form a seat in the object against which the washer is pressed.

Other objects and advantages will be hereinafter referred to and more particularly pointed out in the specification and claim.
In the accompanying drawings which are made a part of this application, Figure 1 is a transverse sectional view through an object showing my improved locking mechanism applied thereto. Fig. 2 is an end elevation of the bolt and parts through which the bolt is extended. Fig. 3 is a face view of the locking washer. Fig. 4 is a similar view of the opposite face of the washer, and, Fig. 5 is an edge elevation of the washer.
Referring to the drawings in which similar reference numerals designate corresponding parts throughout the several views, 1 indicates a bolt which may be constructed in the usual or any preferred manner and 2 indicates the objects through which the bolt is introduced and in this instance, the object is constructed of a number of sections. One end of the bolt is threaded to receive a nut 3, which serves to hold the sections of the object locked together and in order to prevent the nut from turning on the bolt or from being casually removed from the bolt, I provide my improved form of split washer 4, the channel 5 formed by splitting the washer extending tangentially of the contour of the opening 6 through the washer. One end 7 of the washer remains in the same plane with the body of the washer, while the opposite end 8 is extended outwardly and the peripheral edge thereof provided with a curved projection 9, against which the peripheral edge of the nut will engage when the nut is being turned on or off the bolt. By this construction, it will be readily seen that when the nut is turned inwardly, the end 8 will be gradually moved inwardly until it is brought in the same plane with the end 7, while the outward pressure occasioned by the end 8 will hold the objects on the bolt in assembled position and thus compensate for any slack occasioned by shrinkage of the object. It will further be seen that by providing the curved projection, which is so arranged as to engage the flat faces of the nut and overhang the same when the nut is turned to predetermined positions, said nut will be positively held against reverse rotation until a wrench or similar object is applied thereto.

One face of the washer is provided with a plurality of teeth 10, the inner ends of which teeth terminate with the edge of the opening 6 and the side faces of said teeth converge at a point a distance from the edge of the opening and as said teeth are substantially V shaped in cross section, a sharp cutting edge 11 will be provided for each tooth, said cutting edge being inclined from the outer end of the tooth to the inner end thereof, said edge terminating at the convergence of the side walls. By constructing the teeth in this manner, they are made conical as well as substantially V shaped in cross section and will readily enter the object against which the washer is forced cutting a seat therein, even though the object be formed of metal. By placing the teeth adjacent the opening 6 in the washer, the highest portion of the teeth will engage the object adjacent the opening in the object and in view of the trend of the teeth, the material composing the object will be readily displaced by the teeth, thereby forming a seat in the object to receive the teeth and as the displaced portion of the object will tend to enter the opening therethrough, said teeth will form the seats without becoming broken or mashed, as is the case with the usual form of teeth placed upon washers of this class.

The teeth 10 are formed integral with the washer and in view of this fact, the washer can be as cheaply constructed as the usual form of washer and it will likewise be seen that by placing a washer around the bolt and adjacent the head thereof, said bolt will be held against rotation, while the nut is being turned thereon and it will likewise be seen that when the nut has been turned on to the bolt a sufficient distance to force the teeth of the washer into the object, the washer will be held against rotation, while the curved projection on the end of the washer will hold said nut against casual rotation. It will likewise be seen that by providing the compound curvature on the projection, that although the projection extends over the face of the nut yet said nut can be rotated in either direction when power is applied thereto.

What I claim is:—

A nut lock, comprising the combination with a bolt, adapted to be introduced through an opening in an object and a nut adapted to be turned on to said bolt, of a washer having an opening therethrough and a slit extending from the opening to the outer edge of the washer, said slit being at a tangent to the contour of the opening through the washer, said washer having integral teeth on one face thereof, which teeth are conical and substantially V shaped in cross section, the base of said teeth being positioned at the edge of the opening in the washer, whereby they will engage the object at the edge of the opening therethrough and means upon one end of the washer adapted to hold the nut against casual rotation.

In testimony whereof I have signed my name to this specification in the presence of two subscribing witnesses.

OLOF A. NORLUND.

Witnesses:
HARRY T. STIGER,
E. M. GRIGGS.